(12) United States Patent
Shelton et al.

(10) Patent No.: US 11,695,787 B2
(45) Date of Patent: Jul. 4, 2023

(54) APPARATUS AND METHODS FOR DETERMINING EVENT INFORMATION AND INTRUSION DETECTION AT A HOST DEVICE

(71) Applicant: HAWK NETWORK DEFENSE, INC., Dallas, TX (US)

(72) Inventors: Timothy J. Shelton, Dallas, TX (US); David Edwin Harris, Southlake, TX (US); Todd Jason Wheeler, Jr., Plano, TX (US)

(73) Assignee: Hawk Network Defense, Inc., Dallas, TX (US)

( * ) Notice: Subject to any disclaimer, the term of this patent is extended or adjusted under 35 U.S.C. 154(b) by 424 days.

(21) Appl. No.: 16/918,935

(22) Filed: Jul. 1, 2020

(65) Prior Publication Data

US 2022/0006820 A1    Jan. 6, 2022

(51) Int. Cl.
*H04L 9/40*       (2022.01)
*G06F 16/22*      (2019.01)

(52) U.S. Cl.
CPC ...... *H04L 63/1416* (2013.01); *G06F 16/2282* (2019.01)

(58) Field of Classification Search
USPC .......................................................... 726/23
See application file for complete search history.

(56) References Cited

U.S. PATENT DOCUMENTS

| | | |
|---|---|---|
| 7,620,715 B2 | 11/2009 | Difalco et al. |
| 7,752,663 B2 | 7/2010 | Nakakoji et al. |
| 8,176,158 B2 | 5/2012 | Difalco et al. |
| 8,272,054 B2 | 9/2012 | Dequevy |
| 8,607,353 B2 | 12/2013 | Rippert, Jr. et al. |
| 8,631,496 B2 | 1/2014 | Dequevy |
| 9,031,916 B2 | 5/2015 | Huang et al. |
| 9,166,989 B2 | 10/2015 | Huang et al. |
| 9,246,779 B2 | 1/2016 | Ady et al. |
| 9,256,841 B2 | 2/2016 | Difalco et al. |
| 9,306,962 B1 | 4/2016 | Pinto |
| 9,338,187 B1 | 5/2016 | Oprea et al. |
| 9,654,485 B1 | 5/2017 | Neumann |
| 9,661,016 B2 | 5/2017 | Khuti et al. |
| 9,948,678 B2 | 4/2018 | Tcherchian et al. |
| 10,061,805 B2 | 8/2018 | Tidwell et al. |
| 10,084,642 B2 * | 9/2018 | Goldfarb ............ H04L 12/4633 |
| 10,121,010 B2 | 11/2018 | Landau et al. |
| 10,193,867 B2 | 1/2019 | Subbarayan et al. |
| 10,264,022 B2 | 4/2019 | Difalco et al. |

(Continued)

*Primary Examiner* — Sakinah White Taylor
(74) *Attorney, Agent, or Firm* — Peter Zura; Loza & Loza, LLP

(57) ABSTRACT

Disclosed are apparatus and methods that facilitate analysis of events associated with network and computer systems. The methodology includes determining at least one lookup key in a host device for an event occurring in the host device and determining whether the at least one lookup key is used in a memory to determine if at least one key-value pair exists for the event. The methodology also includes appending the at least one key-value pair to the event, and storing the at least one key-value pair in the memory based on the at least one lookup key including replacing existing keys found for the at least one lookup key.

19 Claims, 15 Drawing Sheets

(56) References Cited

U.S. PATENT DOCUMENTS

| | | | |
|---|---|---|---|
| 2012/0284637 A1* | 11/2012 | Boyer | G06Q 10/109 |
| | | | 715/751 |
| 2013/0046601 A1* | 2/2013 | Skelton | G06Q 30/0256 |
| | | | 705/14.25 |
| 2014/0096181 A1 | 4/2014 | Rivers | |
| 2015/0244598 A1 | 8/2015 | Puhlmann et al. | |
| 2016/0019279 A1* | 1/2016 | Sengupta | G06F 16/275 |
| | | | 707/625 |
| 2017/0329968 A1 | 11/2017 | Wachdorf et al. | |
| 2018/0115578 A1 | 4/2018 | Subbarayan et al. | |
| 2019/0012486 A1 | 1/2019 | Landau | |
| 2019/0018958 A1 | 1/2019 | Desimone | |
| 2019/0019058 A1 | 1/2019 | Woodbridge et al. | |
| 2019/0108366 A1* | 4/2019 | Resch | G06F 21/72 |
| 2019/0190947 A1* | 6/2019 | Nsouli | H04L 63/1441 |
| 2020/0145439 A1* | 5/2020 | Griggs | H04L 63/101 |
| 2020/0177534 A1* | 6/2020 | Kalmady | H04L 51/00 |
| 2020/0304540 A1* | 9/2020 | Chang | H04L 63/1416 |
| 2020/0394167 A1* | 12/2020 | Garvey | G06F 12/0815 |
| 2021/0185142 A1* | 6/2021 | Paduroiu | H04L 65/60 |
| 2021/0216536 A1* | 7/2021 | Rogers | G06F 16/958 |
| 2021/0286814 A1* | 9/2021 | Prunier | G06F 16/2477 |
| 2021/0406239 A1* | 12/2021 | Kounavis | G06F 16/2255 |

\* cited by examiner

APPARATUS AND METHODS FOR DETERMINING EVENT INFORMATION AND INTRUSION DETECTION AT A HOST DEVICE

INTRODUCTION

Field

The present disclosure relates generally to computer security information and event management, and more particularly to methods and apparatus for enhancing event data and responding to events based on the enhanced event data at the host device or end user level.

BACKGROUND

Modern computer systems are typically formed of a number of interacting or interdependent components such as servers and end user devices. During operation of such components, many varied system events occur, both internal events within the component or system as well as external events that potentially affect and threaten operation of the component or system, as well as compromise the security of the component or system. A manager or operator of the computer system and component therein, in order to be fully aware of the system operation, should be aware of security information and security-related events that could adversely affect the security and operation of the system and components therein.

In order to track security information and security-related events in a system or network, known solutions may include Security Information and Event Management (SIEM) software, hardware, or processes. SIEM processes may include logging (e.g., aggregation) and analysis (analytics) of activity, such as threat activity, for a network (e.g., an Information Technology (IT) infrastructure). Additionally, the SIEM processes may collect (e.g., log) security threat data from various network devices, servers, domain controllers, intrusion detection systems (IDS's), etc., and then analyze that security threat data to manage the security threats. SIEM software, hardware, and processes, however, do not provide the ability to effectively contextualize event information or data, nor provide the ability to monitor events at the host level or at end point devices to gain insight into the computer network or system. Accordingly, a need exists for solutions to provide insight into events happening in a computer system, as well as detecting threats at the host or end user level that may or may not be present on the network.

SUMMARY

The present disclosure provides apparatus and associated methods for analyzing events occurring at a system, such as a computer network system. In one aspect, a disclosed method is configured for analyzing events in a host device in a computer network system. The method includes determining at least one lookup key in a host device for an event occurring in the host device. Additionally, the method includes determining whether the lookup key is used in a memory to determine if at least one key-value pair exists for the event. In yet further aspects, the method includes appending at least one key-value pair to the event append if at least one key-value pair is determined to exist for the event, and then storing the at least one key-value pair in the memory based on the lookup key including replacing existing keys found for the lookup key.

In another aspect, a computer-readable medium storing computer executable code is disclosed. The code, when executed by a processor, causes the processor to determine at least one lookup key in a host device for an event occurring in the host device. The code also causes the processor to determine whether the lookup key is used in a memory to determine if at least one key-value pair exists for the event. Still further, the code also causes the processor to append at least one key-value pair to the event if at least one key-value pair is determined to exist for the event, and to store the key-value pair in the memory based on the one lookup key including replacing existing keys found for the lookup key.

DETAILED DESCRIPTION

The present disclosure relates to methods and apparatus for enhancing data or information logs of computer system events occurring at a host device and providing host intrusion detection based on the enhanced logging. The methods and apparatus include logging (e.g., aggregation) and analysis (analytics) of activity, such as threat activity, for a network or system. In particular aspects, the disclosed methodology may include enhancing or enriching the log output of system logs by intelligently linking the process id and session id of every single log. Enriching the log output affords better insight into what is actually happening on the system. In further disclosed aspects, the present apparatus and methods may include detecting threats at the host level, where those threats may or may not be present on the network, thus giving better insight to threats for the host level that may be missed by merely looking at the network threats.

Figure 1:
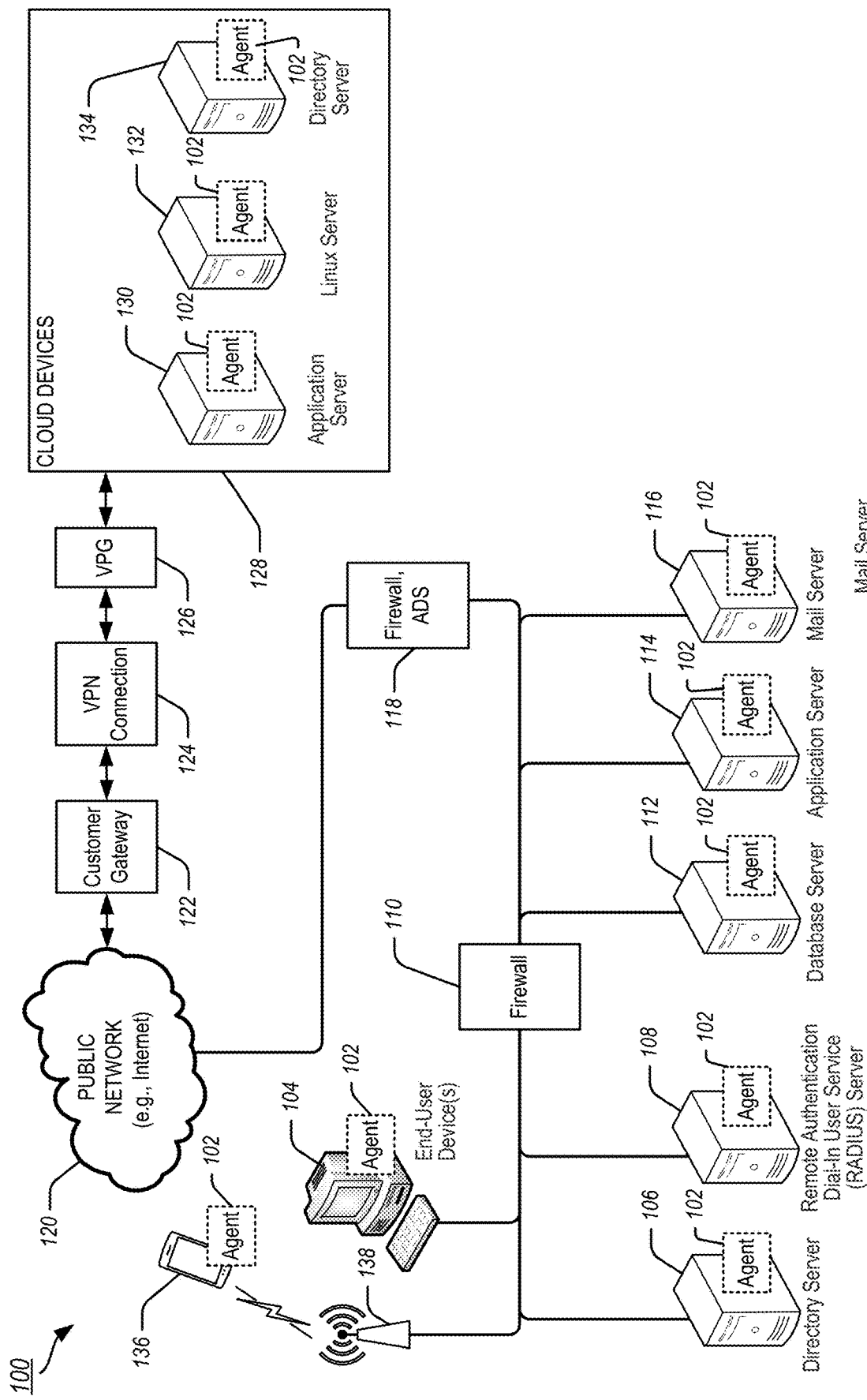
FIG. 1 illustrates a functional block diagram of an exemplary system in which the presently disclosed apparatus and methods may be employed.

Referring to FIG. 1, an exemplary computer system, shown generally at 100, in which the presently disclosed apparatus and methodologies may be applied. In the example of FIG. 1, various multiple systems or networks may be monitored with using an agent 102, such as software and/or hardware agent configured to execute the processes and operations disclosed herein. As will be evident to one skilled in the art, the agent 102 may be configured to log or aggregate and enhance data concerning a host device and further analyze the enhanced or enriched data for the purpose of detecting intrusions of the host device. Additionally, those skilled in the art will appreciate that although one reference number 102 is used to designate each instance and/or location of the agent 102, this is not meant to signify that this is one unitary agent, but rather that each instance or loading is a same software and/or hardware package that may be loaded or installed in various different host devices.

In the system 100, the agent 102 may be configured to monitor device such as end user devices or servers in a computer network system, which may comprise an IT system for a particular client or business, or host devices in a remote network, virtual private network (VPN), and/or cloud device (e.g., 128) that are connected to a public network 120, such as the internet (e.g., a TCP/IP protocol network). In another aspect, the network may include one or more firewalls, instruction detection system (IDS), and/or intrusion protection system (IPS), as shown by blocks 110 and 118. Additionally, the network may include network switching and routers, which are not illustrated for sake of clarity and brevity. It is also noted here that this illustration of system 100 is merely exemplary for the sake of illustration, and is not intended to be exhaustive of the types of network devices or the different couplings and equipment that may be used in a particular system.

Agent 102 may be configured to have installed therein and monitor host devices such as end user device 104 (e.g., a computer), or various servers such as directory server 106, Remote Authentication Dial-In User Service (RADIUS) server 108, database server 112, Application server 114, or mail server 116 as some examples. In some other aspects, remote or cloud devices coupled through a customer gateway 122, VPN connection 124 and virtual private gateway 126 may further include installations of the agent 102. As shown in cloud devices 128, various cloud devices such as an application server 130, a Linux server 132, or a directory server 134 are other examples of host devices on which the agent 102 may be installed. Additionally, other devices such as handheld and mobile devices as illustrated 136 connected to a network through a gateway or wireless access point 138 may also be candidate host devices on which the agent 102 is installed.

Figure 2:
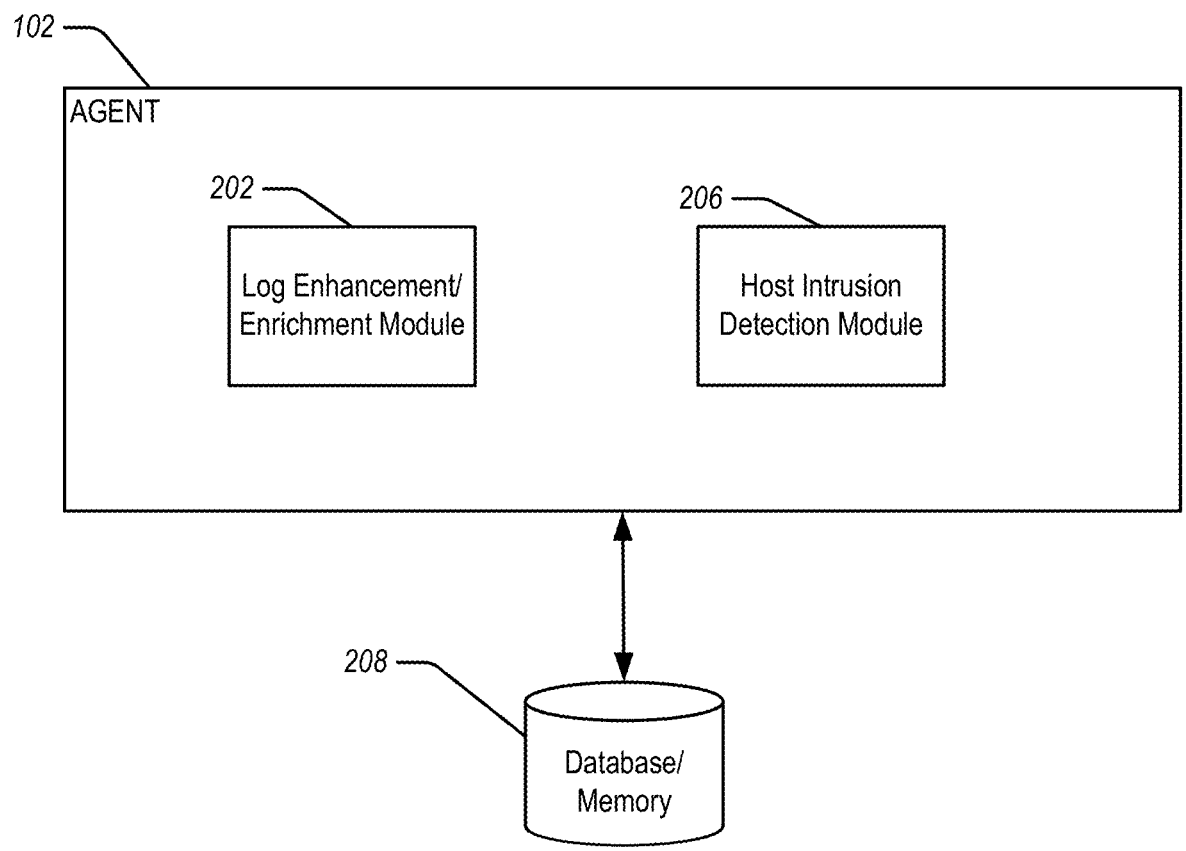
FIG. 2 illustrates a block diagram of an exemplary agent on a host according to certain aspects of the present disclosure.

Within the agent 102, which may be implemented with software or a combination of hardware and software, are the agent system instructions, which implement the various functionalities, as will be described in more detail below, and a database/memory/cache used to store/log security events and other information. FIG. 2 illustrates one particular exemplary structure of the agent 102 and, in particular, the agent system instructions. In this example, the instructions may include various modules or functions including a log enhancement or enrichment module, function, circuitry, or instruction 202 that is configured to, among other things, enrich system log events, provide data enrichment of log events, provide intelligent logging agents, link session and process identifiers (IDs) (which may include parent process IDs and child process IDs) to create a single log output, enrich system log events, and enrich data of log events, such as log data stored in database or memory 208.

Yet further, the agent system instructions may include a host intrusion detection module, function, circuitry, or instruction 206. This module 206 may be configured to detect threats at the host level that may or may not be present on the network. Thus, this module 206 affords detection threats that might not normally be detected in system level detection processes or devices such as SIEMs.

Concerning the log enhancement or enrichment module 202, in particular, it is noted that this module may be configured to store previously generated key/value pairs for a given lookup key. In an aspect, the lookup key is a correlation fields that is stored and is to be added to subsequent events that match the same correlation field configured for event enrichment. As additional events arrive that match the look up key (or "correlation field"), all key/value pairs that match this lookup key will be added to the event for enrichment. Further, if an existing key is already found within the event, the previous key and value will be added with a label marking them as the previous value. This previous value allows for real-time comparisons of state changes. Measurements of state change can be explicit by defining scenarios, or can be measured indirectly by ways of machine learning (ML) such has Hidden Markov chains.

Figure 3A:
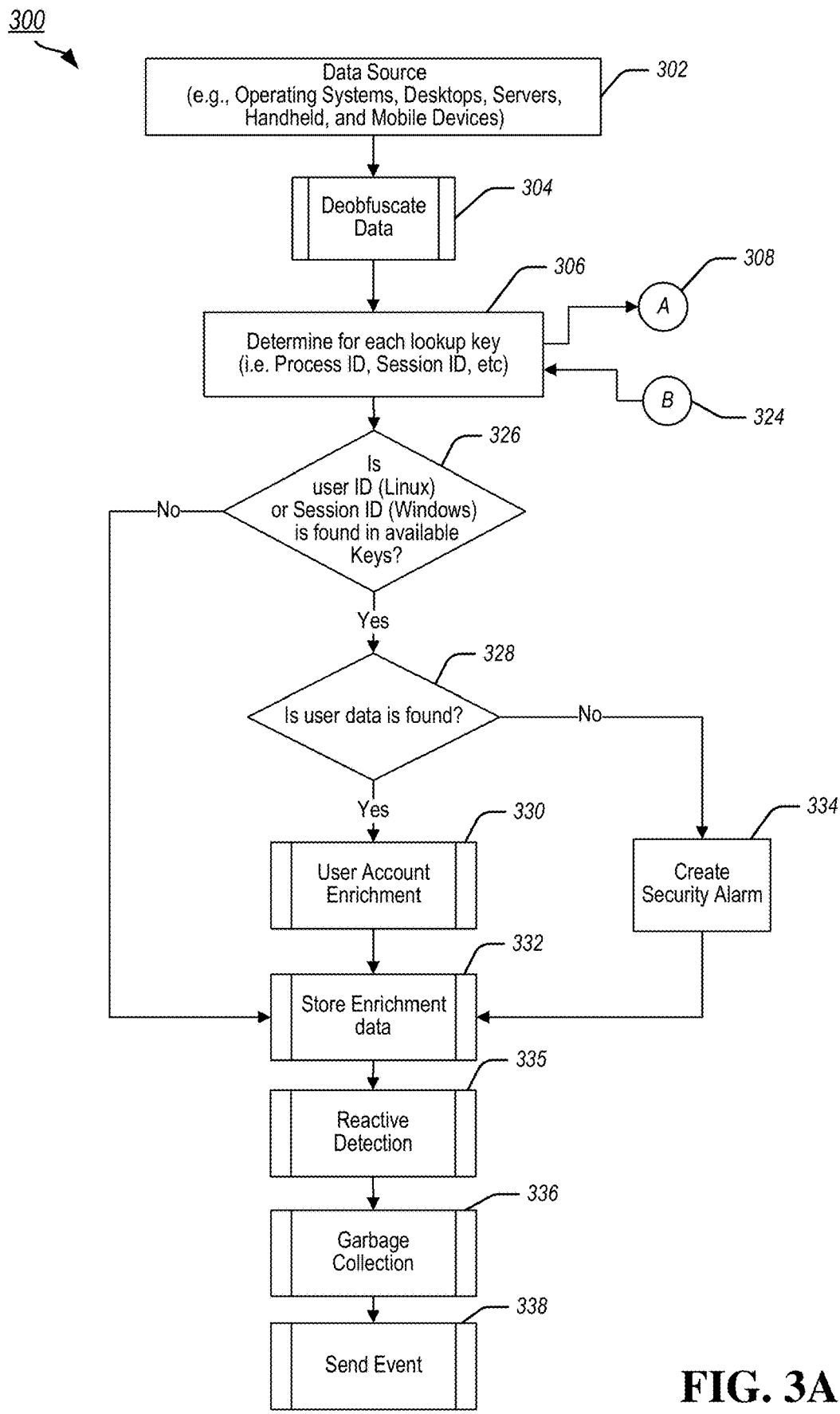
FIGS. 3A and 3B illustrate a flow diagram of a method for enhancing event data according to certain aspects of the present disclosure.
Figure 3B:
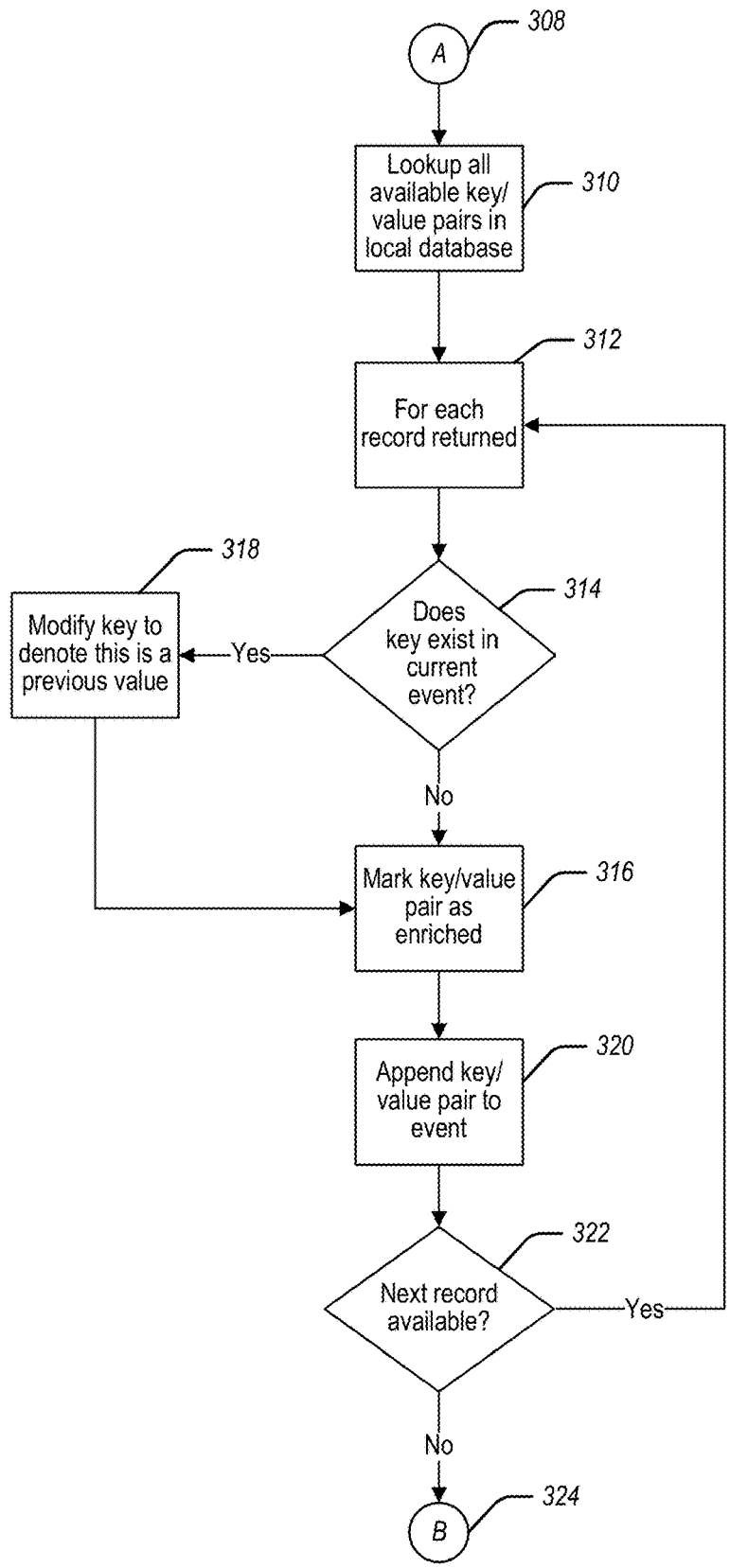

Turning to FIG. 3A, this figure illustrates a flow diagram of a method or process 300 that may be effected by the module 202, as one example. In this method 300, a data source is first accessed, such as operating systems (OS), desktops, servers, handheld or mobile devices, etc. as shown in block 302. The data is collected or accessed from the various devices at block 302 and then deobfuscated (if necessary) in subsequent block 304. The deobfuscation process in block 304 may comprise various operations as will be described in more detail in FIG. 4 to follow. After deobfuscation in block 304, flow proceeds to a process 306 for accessing each of a number of lookup key/value pairs under consideration by method 300. This may include process IDs, session IDs As shown at block A also designated with reference 308, the process of looking up the key/value pairs is further illustrated in FIG. 3B. Here, method 300 includes a process 310 entailing looking up all available key/value pairs in a local database, such as database 128 in one example. Flow then proceeds to block 312, which starts processes for marking or modifying the key/value pairs for the set of all records returned from the lookup process of block 310. Accordingly, flow proceeds to decision block 314 where a determination is made whether a particular key exists in the current event (this example includes the current log line entry, or individual windows log event. Each event (item) is processed individually at the time it occurs. If the key does not exist in the current event, flow proceeds to block 316 where the key/value pair is then marked as being "enriched." Alternatively, if the key does exist in the current event as determined at block 314, then flow proceeds to block 318 where the key is modified to then denote this as a previous value. After this modification, flow then proceeds to block 316 where the key/value pair of the modified key can then be marked as "enriched."

Next, method 300 includes appending the key/value pair to the current event as shown in block 320. The purpose of this step is to populate the given "correlation key" with key/value pairs and store them in the datastore or database. After the process of block 320, flow proceeds to decision block 322 where a determination is made whether a next record is available. If yes, the flow loops back to block 312 for accessing a next record and modifying/marking the associated key/value pairs. Once all records have been processed, flow proceeds to "B" denoted by reference number 324 for return back to block 306 in FIG. 3A.

With reference again to FIG. 3A, after the enhancements of the key/value pairs, flow proceeds to decision block 326. Here a determination is made whether a user ID (in the case of Linux based systems) or a session ID (in the case of Windows™ based systems, which may also utilize usernames) is found in available keys. If yes, then flow proceeds to decision block 328 to determine if associated user data is found. If yes, then flow proceeds to block 330 where the user account in enriched, as will be explained in more detail later in connection with FIG. 5. Next, flow proceeds to block 332 where the enrichment data is stored, as will be explained in more detail later in connection with FIG. 6.

If the correlation key (e.g., user ID or session ID) in not found in the available keys as determined at block 326, the flow proceeds directly to storing of the enrichment data in block 332. In addition, if the user data is not found in block 328, flow proceeds to block 334 where a security alarm is created, and then flow proceeds to block 332. When a username is found without an available user profile, this may be indicative of account or system tampering, warranting creation of the security alarm.

After storage of the enrichment data in block 332, flow proceeds to a reactive detection process 335, an example of which will be described later with regard to FIG. 10. After the reactive detection in block 335, flow proceeds to a garbage collection process as shown in block 336. The garbage collection processes will be described further with regard to FIGS. 7 and 8 below. After garbage collection is completed, method 300 includes process 338 of sending the resultant event data to an agent, such as agent 134 in FIG. 2 as one example.

Figure 4:
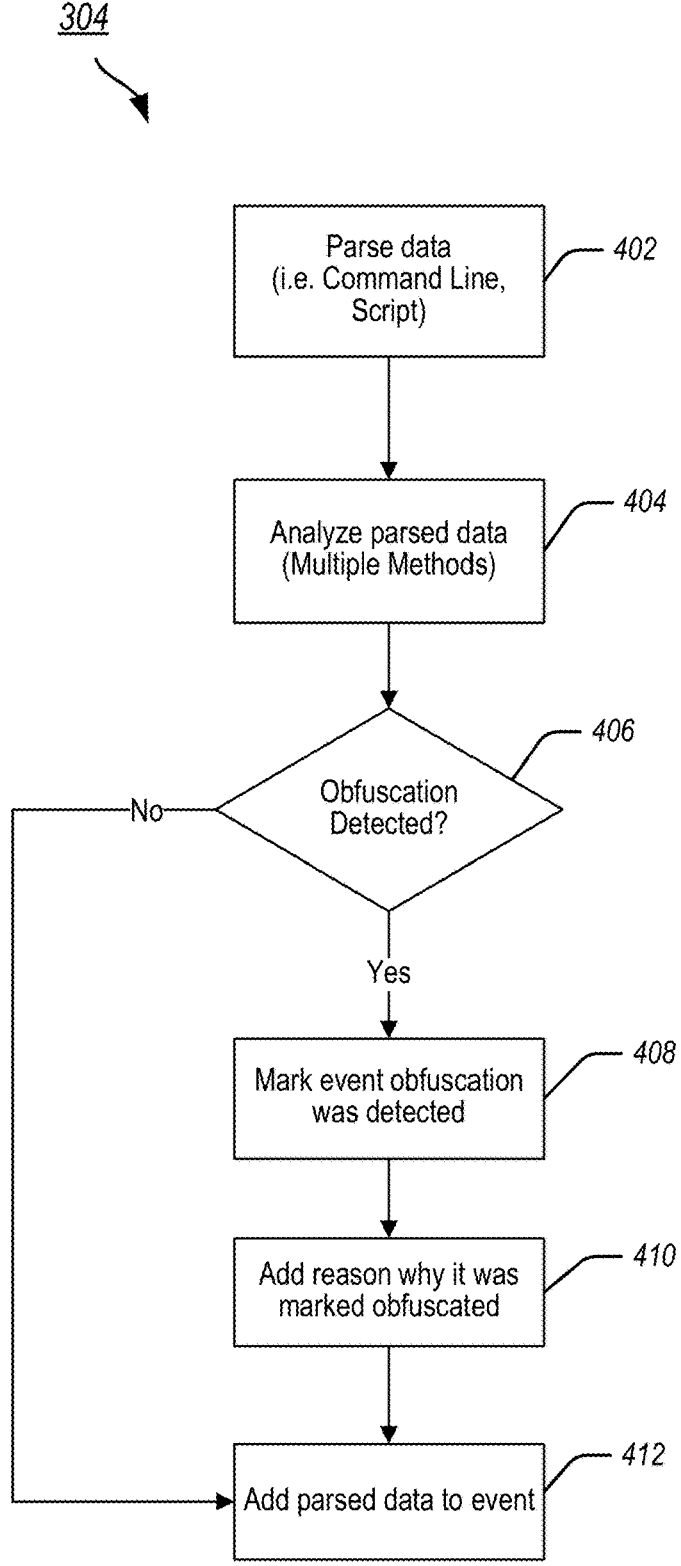
FIG. 4 illustrates a detailed flow diagram of the deobfuscation process shown in block 304 of FIG. 3A according to certain aspects of the present disclosure.

FIG. 4 illustrates a detailed flow diagram of the deobfuscation process shown in block 304 of FIG. 3A. As shown, process 304 includes first parsing the data, such as using the command line or script as shown at block 402. Next, the parsed data is analyzed at block 404. This parsing may include a number of different methodologies including looking at binary data, argument data, file path data, free text, basic Fourier decoding, non-conforming data, and special characters, along with measurements of variance and population standard deviation compared against a threshold. In certain aspects of the present disclosure, detecting the presence of obfuscation in a command line or Microsoft PowerShell (i.e., an attempt to hide the true nature of the command's intent) includes first identifying the original "line" and actualizing or converting the line by reducing, parsing out, or deducing the command line to its most basic steps as the operating system may see it. One example of this actualization and deduction, in the context of Windows, is to use the CommandLineToArgv (or any suitable API to decode the command line such as wordexp in Linux), which will reduce the command line to its specific argument parameters in an array. Where an item 0 points to the first command line argument, an item 1 points to the second command line argument, and so on. The command line is then reassembled from the newly parsed arguments back to a single string by simply appending them together in 0, 1, 2, x order. If a space exists in the argument, then quotes will be provided around the argument when appending. For example, the detection of the presence of obfuscation may execute the following procedure where:

[0]: FirstArgument
[1]: Second Argument
[2]: Third_Argument.

Items [0] through [2] in this example may then be turned into the following string: FirstArgument "Second Argument" Third_Argument. Note that quotes are placed around the second argument in this string in this example to indicate potential obfuscation.

In another example, given a command (cmd.exe) such as "echo", a non-obfuscated command might be "echo Hello". On the other hand, an obfuscated echo command might be configured as "echo ^He^l^lo". Application of CommandLineToArgv, for example, may then help to identify such obfuscation.

Once the new deobfuscated line is obtained, along with the original line entry, several measurements or analyses may be applied to attempt to detect obfuscation. According to further aspects, analysis or measurement may include looking for the presence of known bad characters such as "^" or "%". If bad characters are present, then there is a possible obfuscation and the process may be configured to further report this possible obfuscation. If no bad characters are present, then the measurement or analysis may further include calculating the population standard deviation between the length of the original line in characters and the length of the line in characters created after the deobfuscation detection steps or process described above.

If the population standard deviation size is greater than predetermined or preconfigured thresholds, then detection of obfuscation is deemed successful. Additionally, the thresholds may be further used to classify into different levels of confidence. In an example, three different levels of confidence may be specified for detection. For example, a population standard deviation size greater than 5 but less than 7 may be labeled with a low confidence but marked as detected, whereas a level greater than or equal to 7.0 but not greater than 10.0 may be labeled with a medium confidence level, and anything greater than or equal to a standard deviation of 10.0 may be marked with high confidence.

Another method of obfuscation detection is the use of storing statistics of the minimum length, maximum length, median length, and mean length of each command line argument based upon the username (user). A statistical profile or model is built on a predetermined time period such as a monthly or daily time period, and the total calculations used for measurement in an outlier detection is gathered from the summary of those available time period profiles or models. Profiles or models older than the total considered time period are removed. For example, models are created for each user on a per month basis. Any months older than 12 months are removed and not used as part of the calculation of the needed statistical measurement. Examples of statistical measurements needed include sum, min, max, count, variance, delta, median, mad, quantiles, average, and distinct. The use of statistical outlier anomaly detection can then be used to detect abnormal command lines based upon a user's statistical model. Examples of these outlier detections include extreme studentized deviate (ESD) outliers, semantic based regularization (SBR) outliers, and Hampel outliers. Additionally common outlier thresholds can be configured. For example, the ESD outlier threshold may be 2 (low confidence), 3 (medium), or 4 (high), the Hampel Outlier Threshold 3, and the SBR Outlier Threshold 1.5. Outlier thresholds are applied the same across Hampel, ESD and SBR. The threshold is used to help calculate how wide the high and low values are to be used to compare against a current statistical number.

Turning back to FIG. 4, after the analysis in block 404, flow then proceeds to decision block 406 where a determination is made whether obfuscation is detected or not based on the analyzed parsed data. If obfuscation is detected, flow proceeds to block 408 where the event is marked to signify obfuscation was detected. Additionally, the process 304 may include adding the reason(s) why the event is being marked as being obfuscated as shown in block 410. Flow then proceeds to block 412 where the parsed data is added to the event. It is noted that if obfuscation is not detected at block 406, there is no need for marking the event and flow proceeds from block 406 to block 412 directly as illustrated.

Figure 5:
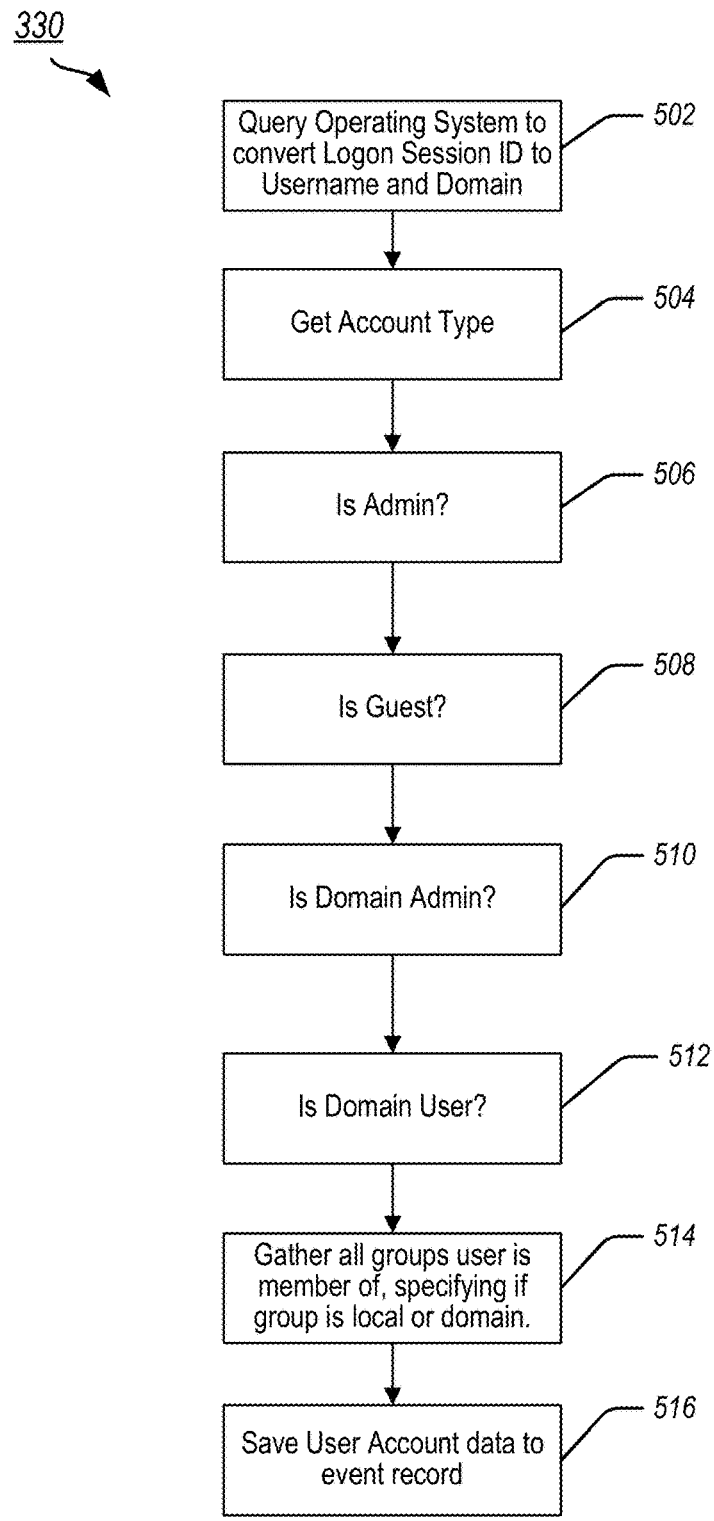
FIG. 5 illustrates a detailed flow diagram of the user account enrichment process 330 shown in block 304 of FIG. 3A according to certain aspects of the present disclosure.

FIG. 5 illustrates a flow diagram of exemplary processes that may occur in the user account enrichment process 330 shown in FIG. 3A. As shown, process 330 may include first querying the operating system to convert a logon session ID to a username and domain as illustrated at block 502. From the converted data and account type may be determined as shown at block 504. After the processes of blocks 502 and 504, a number of queries may be performed to determine the specifics of the account as illustrated by blocks 506, 508, 510, and 512. In particular, the different queries may include whether account is an administrator account (block 506), a guest account (block 508), an admin domain (Block 510), or a user domain (block 512). After these queries, process 330 includes gathering all groups a user is a memory of, and specifying if the groups is local or a domain as shown at block 514. The user account enrichment process 330 concludes by saving the enriched user account data to the event record. This data can be stored either in memory or in a database.

Figure 6:
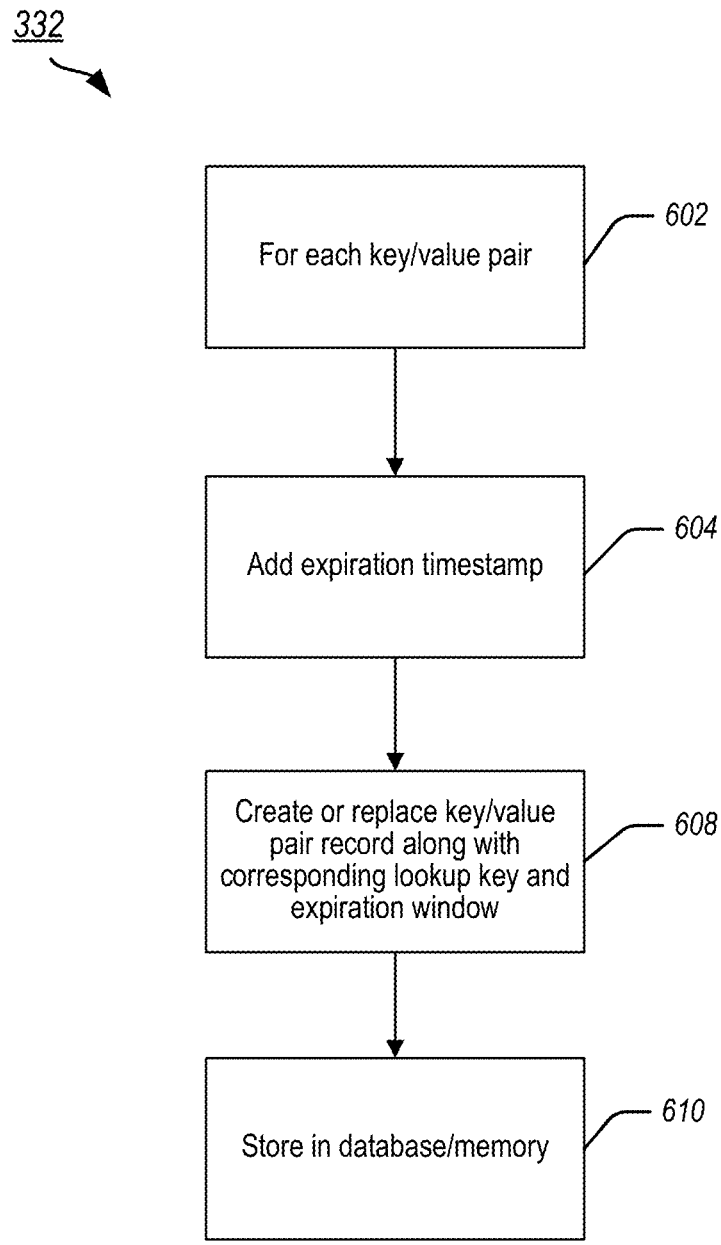
FIG. 6 illustrates a detailed flow diagram of the store enrichment data process 332 shown in block 304 of FIG. 3A according to certain aspects of the present disclosure.

FIG. 6 illustrates a flow diagram of exemplary processes that may occur in the store enrichment data process 332 shown in FIG. 3A. In this example, the storage of the enrichment data occurs for each key/value pair as indicated at block 602. The process 332 includes adding an expiration timestamp to the key/value pair data as shown in block 604. Additionally, process 332 may include creating or replacing key/value pair records along with a corresponding lookup key and an expiration window as shown in block 608. This process is used to populate the local cache/datastore to be used in subsequent lookups. For example, assuming a process has started with an ID (e.g., Process ID 391). Since this is the start of the process, no previous key/value pairs will be present for enrichment (i.e., key/value pairs are available in every event, but no previous key/value pairs are available or designated for enrichment before start of the process). Accordingly, first, key/value pairs are stored based upon the process id. An expiration timestamp may be used later in the garbage collection process to determine whether or not to expire the record based upon the amount of time that has lapsed. After the information is determined at block 608, the information is stored at block 610 in a database or memory, such as database 128 as one example.

Figure 7:
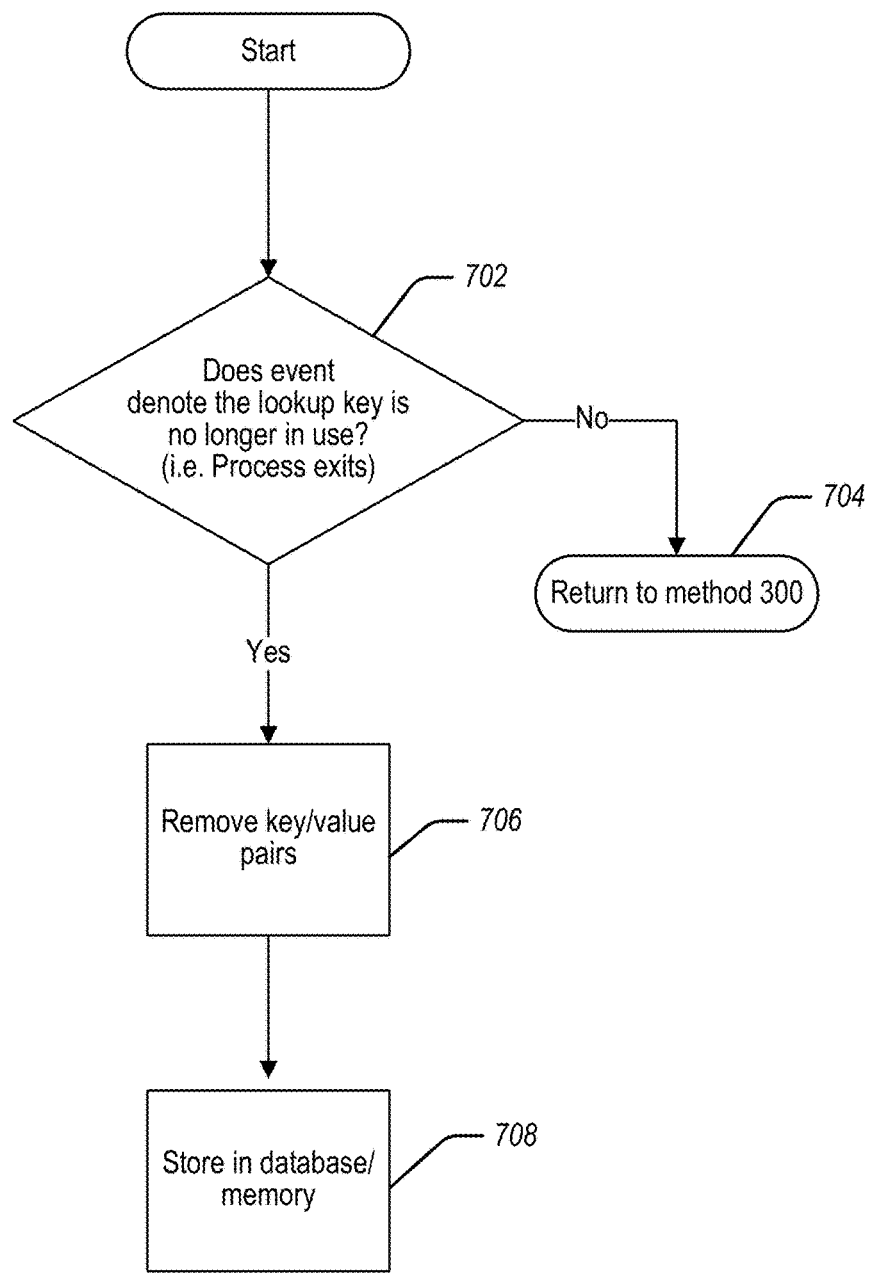
FIG. 7 illustrates a detailed flow diagram of the garbage collection process shown in block 336 of FIG. 3A according to certain aspects of the present disclosure.

FIG. 7 illustrates an example of the garbage collection process 336 shown in FIG. 3A that may be utilized to clean up memory locations in the database. As shown, when the process 336 starts, a decision is made whether the event denotes that the lookup key is no longer in use (i.e., does the process exist?) as shown at decision block 702. If not, there is no need for memory clean up and the flow simply reverts back to the method 300 as shown at block 704. On the other hand, if the lookup key is no in use, flow proceeds to block 706 where the key/value pairs are removed and the database memory is updated as shown in block 708.

Figure 8:
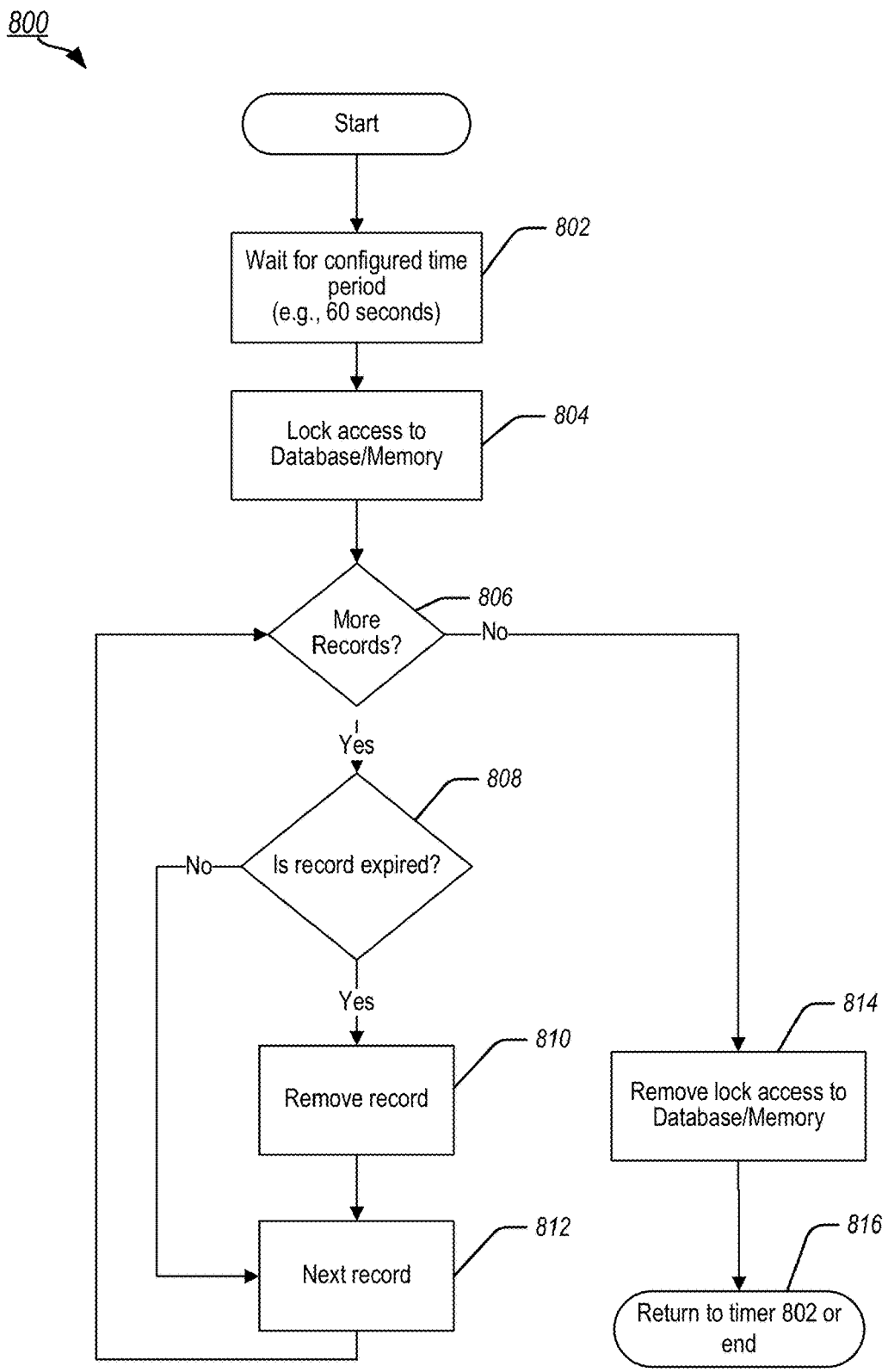
FIG. 8 illustrates a detailed flow diagram of a further independent garbage collection process according to certain aspects of the present disclosure.

The method 300 may also include or have associated therewith an independent garbage collection process 800 shown in FIG. 8. In this method 800, a timer is first initiated to wait for some preconfigured time period (e.g., 60 seconds, but not limited to such) as shown at block 802. After the time period tolls in block 802, flow proceeds to block 804 where access to the database or memory is locked temporarily. After the database is locked, flow proceeds to decision block 806 to determine if any records are available for determination of whether they are active or not. If yes, then flow proceeds to block 808 where a determination is made whether the record is expired. If the record is expired, flow proceeds to block 810 where the record is removed from the database. Flow proceeds from either block 808 (when the condition is negative) or block 810 to block 812 where a pointer (or indicator) is moved to the next record and flow loops back to decision block 806 until all records have been examined. Flow then proceeds to block 814 where the lock on the access to the database is removed and flow may either return to timer block 802 to wait another predetermined time period or end.

In other aspects of method 300 and module 202, it is noted that each key/value pair may be stored locally based upon a correlation key (e.g., "ProcessId"). This value may be normalized into string value and each key/value pair is stored with an association to the correlation key value. Upon subsequent behavior of this event, these values are included, along with the new key/values generated in a next event. The previous key/value pairs are included with the new event and the new event is stored with the updated set of pairs. Additionally, when a conflict from previous events is found, this value is also included in the new event, however the key name is prepended with an identifier to notify this is the previous value. An example would be prepending "XPrev". In addition, by including additional correlation keys, a recursive solution may be built to enrich events based upon any key. An example would be a ProcessId enrichment, along with a Logon/SessionId enrichment that then includes an additional ProcessId or another Logon/SessionId, or further, correlation against previous key/value pairs that have been replaced as the process continues to execute.

To ensure key/value pairs maintain context to the data, all key values are purged on reboots, or when a process exits. This keeps the process from storing data that is not applicable or creating false positives. Additionally, for long running processes, it is possible to set a timeout period per key to expire based upon a time limit. One common example would be 24 hours for long running processes, and 4 hours for logon or session ids since these can hold substantially more information.

Figure 9:
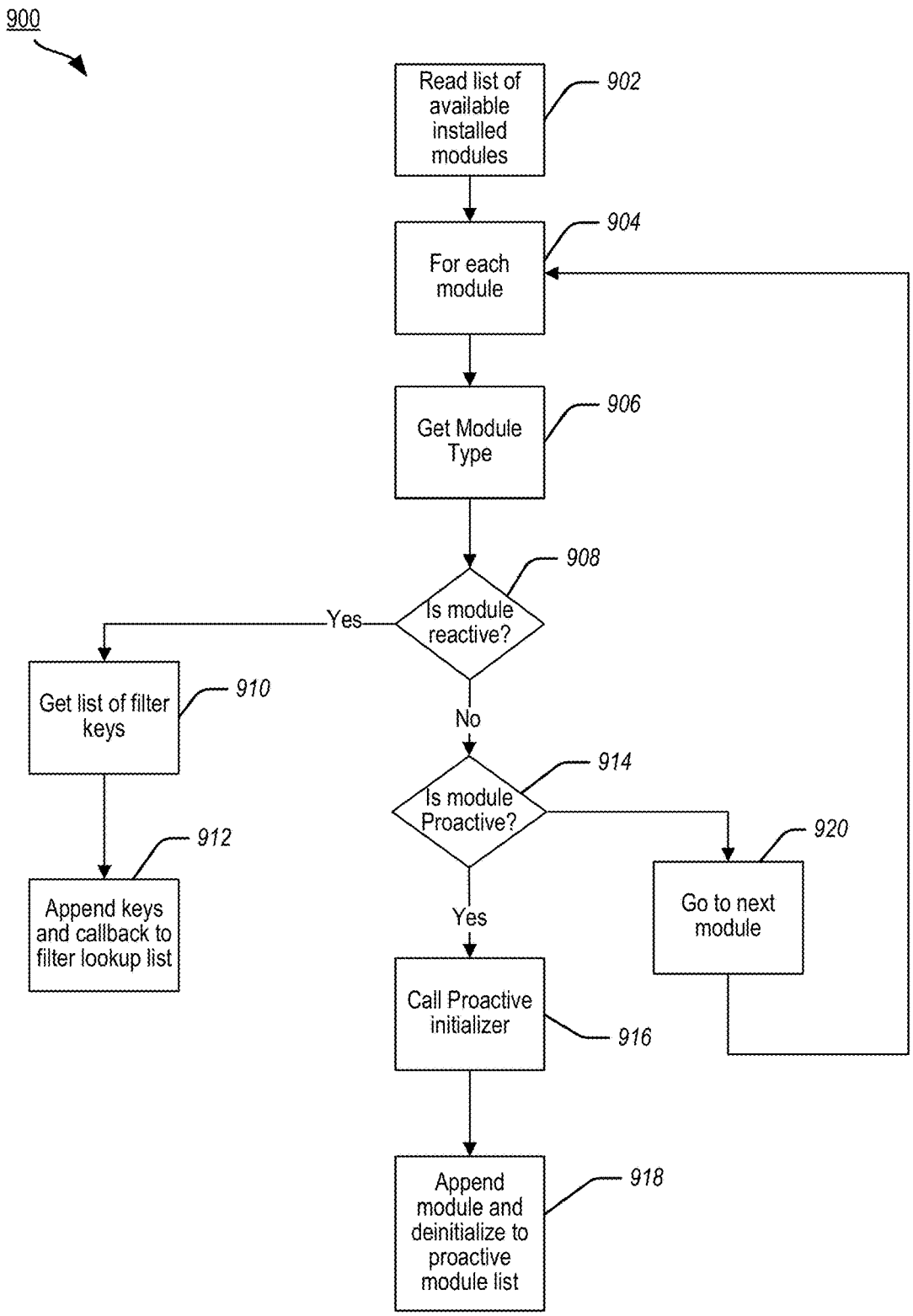
FIG. 9 illustrates an example of a method for host intrusion detection that may be implemented according to certain aspects of the present disclosure.

As discussed earlier, the agent 126 may also include a host intrusion detection module, function, circuitry, or instruction 206. This module 206 may be configured to detect threats at the host level that may or may not be present on the network. FIG. 9 illustrates one example of a methodology 900 that may be implemented by module 206 according to certain aspects.

As illustrated in FIG. 9, method 900 includes reading a list of available installed modules as shown at block 902. The processes of method 900 may be performed for each installed module as shown at block 904. First, the method 900 may include obtaining the module type as shown at block 906, which may be either a reactive or proactive module type. Proactive modules preform an action to obtain the required information, where as a reactive module passively reviews data after the fact and respond/investigate only when the data in question is present or not. In an example, a reactive module type may be configured for monitoring for an attack method AppCert DLLs (MITRE ATT&CK T1182) by passing all Registry Write logs to the given module to detect the presence of "HKEY_LOCAL_MACHINES\System\CurrentControlSet\Control\SessionManager\AppCert DLLS" within the value of the given key (i.e., TargetObject). In an example of a proactive module type, this may include a continuous process of periodically sending out "canary" LLMNR and NBT-NS network requests, and awaiting a response from an unauthorized source attempting to perform authentication negotiations.

Next, a determination is made whether the determined module type is reactive as shown at decision block 908. If the module is reactive, flow proceeds to block 910 where a list of filter keys is obtained the list of filter keys determines whether or not to pass the given event/log/record to the appropriate module. For example, if system event id is 12, 13 or 14 (registry changes) then this is passed to one or more attack analysis engine(s) for MITRE ATT&CK T1103 and MITRE ATT&CK T1182. After getting this list of filters, flow proceeds to block 912 where the keys are appended and a callback is given to the filter lookup list.

On the other hand, if the module is not reactive as determined at block 908, flow proceeds to block 914 where next determination may be made whether the module is proactive. If yes, then a proactive initializer may be called as shown by block 916 and then the module is appended and deinitialized to a proactive module list as shown at block 918. If the module is not proactive as determined at block 914, then flow proceeds to block 920 to call a next module and return to block 904.

Figure 10:
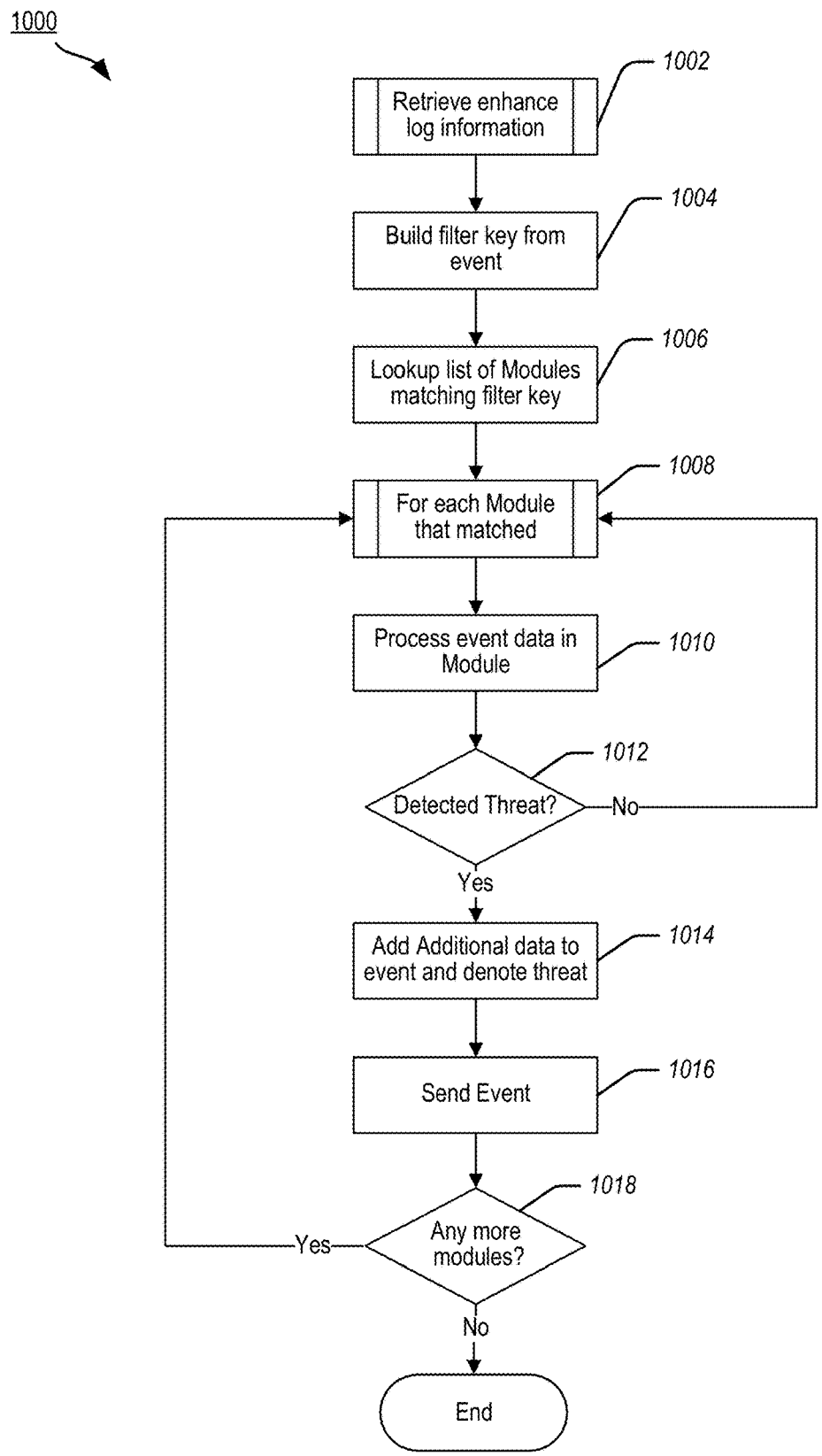
FIG. 10 illustrates a method for reactive host intrusion detection that may be utilized in the method of FIGS. 3 (e.g., process 335) or 9 according to certain aspects of the present disclosure.

FIG. 10 illustrates a block diagram of a reactive host intrusion detection method 1000 that may be employed with method 900 of FIG. 9, or with the processes in block 335 of FIG. 3A. As illustrated at block 1002, method 1000 includes first retrieving or accessing enhanced or enriched information that is developed through method 300 discussed before. From this information, a filter key is built from the event as shown at block 1004. Next, method 1000 includes looking up a list of modules that match the filter key as shown in block 1006. For each module that matches as predicated by block 1008 for each filter match loop, flow proceeds to block 1010 to process event data within the module.

After the block 1010, flow proceeds to a decision block 1012 to determine if a threat is detected. If not, then the flow returns to block 1008 to continue to examine a next detection module, if available. On the other hand, if a threat is detected at block 1012, flow proceeds to block 1014 where additional data is then added to the event and a threat is denoted with the data. The event with the additional data is then sent (i.e., "send event") to a mechanism for delivering the record as shown at block 1016. In an example, the event with the additional data is sent to a mechanism for outputting a single log output that is configured as a structured document such as JSON, XML, CSV, Binary, Proprietary, UTF-8, or ASCII formats. After the event is sent, flow proceeds to decision block 1018 to determine if any more modules need to be considered. If so, then the flow loops back to block 1008 to retrieve a next module that matches the filter and the processes of blocks 1012 through 1016 repeat until all modules have been acted upon.

Figure 11:
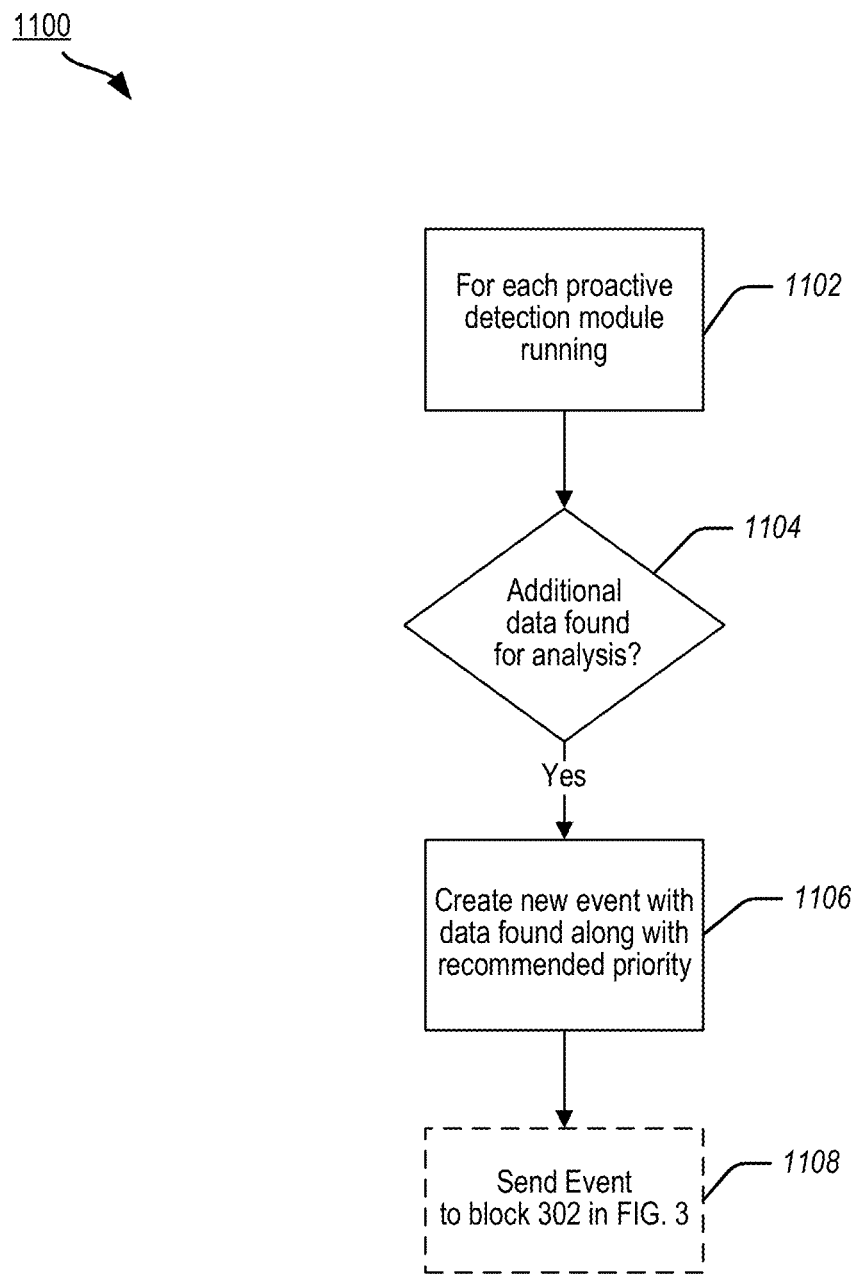
FIG. 11 illustrates a method for proactive host intrusion detection that may be utilized in the method of FIG. 9 according to certain aspects of the present disclosure.

FIG. 11 illustrates a method 1100 of a proactive host intrusion detection method 1100 that may be employed with method 1000 in FIG. 10. As illustrated at block 1102, method 1100 is to be executed for each proactive detection module that is running and method 1100 is not contingent on whether an event matches a filter as in method 1000. Flow proceeds, for each module to be executed, to decision block 1104 where a determination is made whether additional data has been found for analysis. If so, a new event is created with data found along with recommended priority as shown in block 1106. Next, the event may be sent to the process operation 302 in the example of FIG. 3 as shown in block 1108. In an aspect, the event is sent to the reactive detection process. which generates a new alarm/event that is picked or selected via the processes of FIG. 3-9, for example, (and subsequently will go through the processes illustrated in blocks 1008 through 1018 in FIG. 10).

Figure 12:
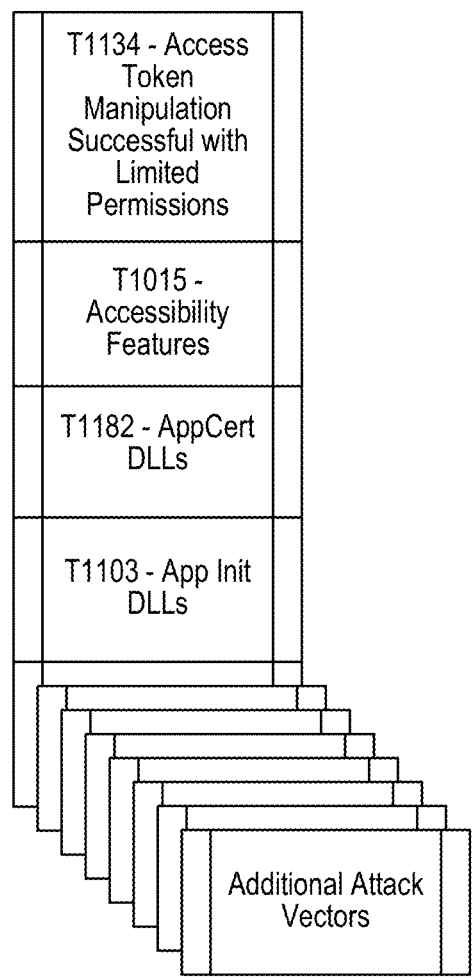
FIG. 12 illustrates examples of various modules that may be utilized with the method of FIG. 9 according to certain aspects of the present disclosure.

FIG. 12 illustrates a diagrammatic representation 1200 of a listing of some of the modules that may be employed in method 900 discussed above, such as list of the read installed modules as shown in block 902 of FIG. 9. In this example, a number of known T modules are illustrated in FIG. 12. These modules are examples of detection modules that are run in the reactive measures processes.

Figure 13:
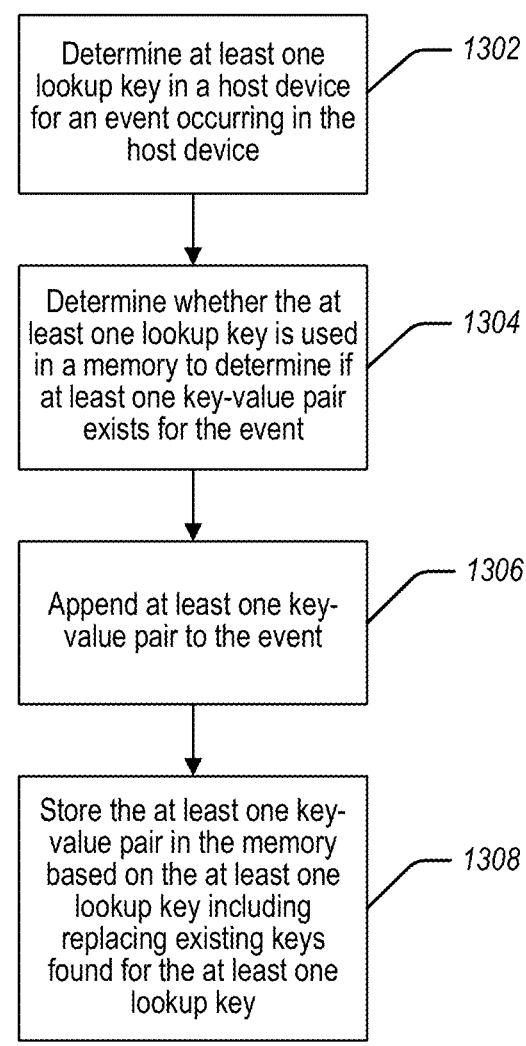
FIG. 13 is a flow diagram of another method for enhancing event data according to certain aspects of the present disclosure.

FIG. 13 illustrates another method 1300 according to other aspects of the present disclosure, which may be executed by agent 102 as an example. In a particular aspect, method 1300 is configured for analyzing events in a host device in a computer network system. At block 1302, the method 1300 includes determining at least one lookup key in a host device for an event occurring in the host device. Next at block 1304, method 1300 includes determining whether the at least one lookup key is used in a memory to determine if at least one key-value pair exists for the event.

After block 1304, the method includes appending at least one key-value pair to the event if at least one key-value pair is determined to exist for the event as shown in block 1306. Finally, method 1300 includes storing the at least one key-value pair in the memory based on the at least one lookup key including replacing existing keys found for the at least one lookup key as shown in block 1308.

In further aspects, method 1300 may include modifying the at least one key to denote the at least one key is a previous value when the at least one key-value pair is determined to exist for the event. Additionally, the process of determining at least one lookup key may further include deobfuscating the value of the at least one lookup key including parsing the event data, and adding the parsed event data to the event. Parsing the event data may include searching for the presence of known malicious characters used for obfuscating data, or measuring a population standard deviation and variance and comparing the measured population standard deviation and variance with at least one predetermined threshold of change.

In yet further aspects, method 1300 may include the at least one lookup key comprising one of a user ID or a session ID. Additionally, method 1300 may include determining whether the user ID or session ID is found in available keys in the memory, and determining whether user data for a user is stored in the memory. In still further aspects, method 1300 may include enhancing a user account of the user when the user data is determined to be stored in the memory. In addition, enhancing the user account may include adding enhancements including adding one or more of an account type, a domain, permissions, a list of all groups that a user is a member of, or one or more active directory attributes.

In yet other aspects, method 1300 may include purging the memory of at least one key-value pair if the key-value pair has a timestamp older than a predetermined time expiration value. Additionally, method 1300 may include determining a session ID and a process ID associated with the event, and linking the session ID and the process ID to create a single log output including the at least one key-value pair. It is noted that the single log output may be configured as a structured document in at least one of JSON, XML, CSV, Binary, Proprietary, UTF-8, or ASCII formats.

Figure 14:
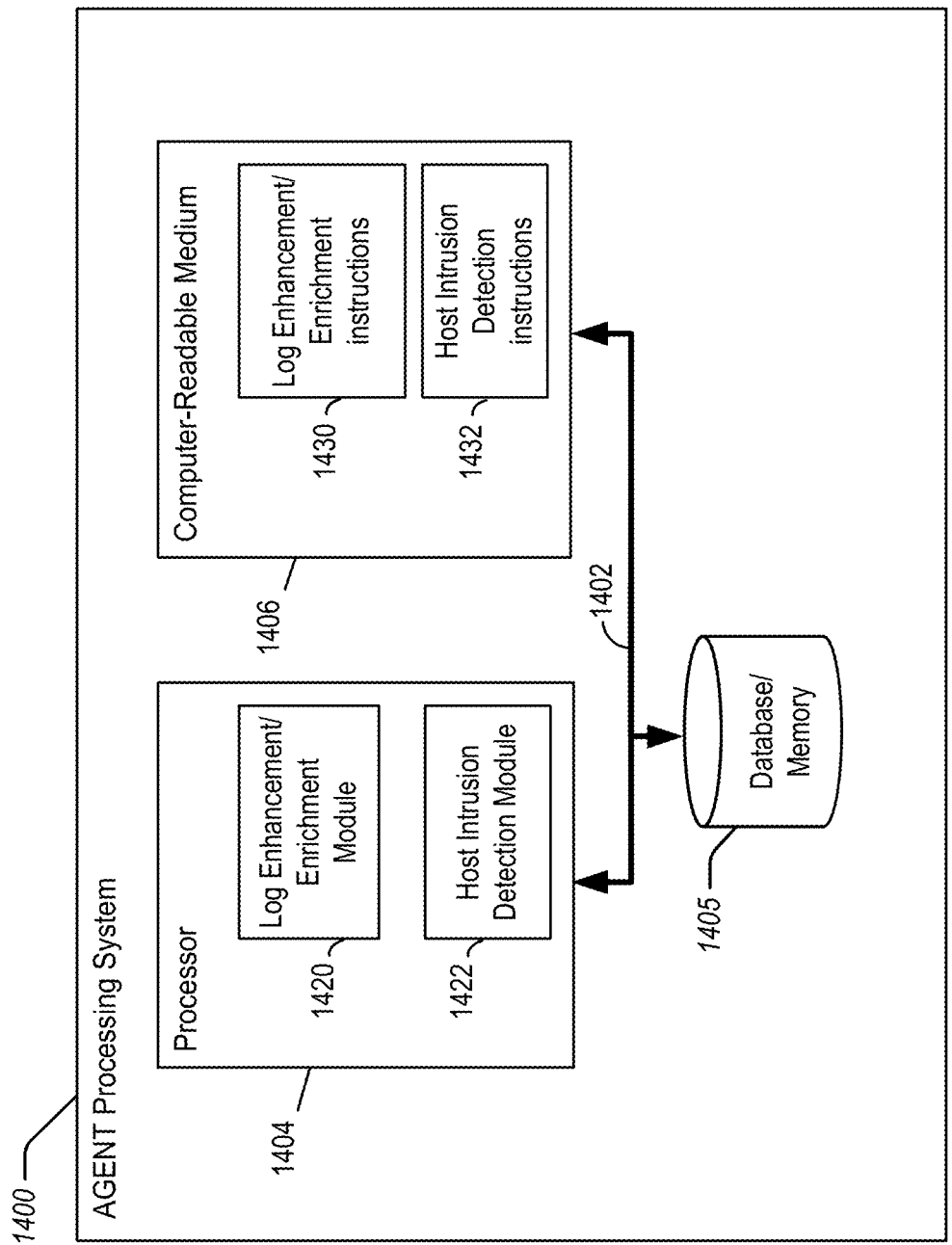
FIG. 14 is a block diagram of an apparatus for effecting an exemplary agent system according to certain aspects of the present disclosure.

FIG. 14 is a block diagram illustrating an example of a hardware implementation for an agent device 1400 that may include a processing system. The agent device 1400 may be implemented with one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the agent device 1400 may be configured to perform any one or more of the functions, processes, and methods described herein in connection with FIGS. 1-13.

In this example, the agent device 1400 may be implemented with a bus architecture, represented generally by the bus 1402, but this merely exemplary. The bus 1402 may include any number of interconnecting buses and bridges depending on the specific application of the processing system of agent 1400 and the overall design constraints. The bus 1402 links together various circuits including one or more processors (represented generally by the processor 1404), a database/memory 1405, and computer-readable media (represented generally by the computer-readable medium 1406). The bus 1402 may also link various other circuits that are well known in the art, and therefore, will not be described any further.

The processor 1404 is responsible for managing the bus 1402 and general processing, including the execution of software stored on the computer-readable medium 1406. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1404, causes the agent 1400 to perform the various functions described above. The computer-readable medium 1406 and the memory 1405 may also be used for storing data that is manipulated by the processor 1404 when executing software.

The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the agent 1400, external to the agent 1400, or distributed across multiple entities including the agent 1400. The computer-readable medium 1406 may be embodied in a computer program product. By way of example, a computer program product may include a computer-readable medium in packaging materials. In some examples, the computer-readable medium 1406 may be part of the memory 1405. Those skilled in the art will recognize how best to implement the described functionality presented throughout this disclosure depending on the particular application and the overall design constraints imposed on the overall system.

In some aspects of the disclosure, the processor 1404 may include circuitry configured for various functions. For example, the processor 1404 may include a log enrichment module or circuitry 1420, which is configured for performing one or more of the processes in FIGS. 3-8 and 13 as discussed herein. Additionally, the computer readable medium 1406 may include complementary instructions for effecting the log enrichment functions of FIGS. 3-8.

Further, processor 1404 may include a host intrusion detection module or circuitry 1422 configured for performing host intrusion detection in conjunction or communication with module 1420 and to effectuate any of the processes or functions of FIGS. 9-11 and 13 as discussed herein. Additionally, the computer readable medium 1406 may include complementary instructions for effecting the host intrusion detection functions of FIGS. 9-11 and 13.

In light of the foregoing, apparatus and methods are provided by which to facilitate analysis of events in host devices that are part of a network system or across multiple networks or computer systems. Those of skill will further appreciate that the various illustrative logical blocks, modules, circuits, and algorithm steps described in connection with the embodiments disclosed herein may be implemented as computer software, as well as hardware or logic, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The steps of a method or algorithm described in connection with the embodiments disclosed herein may be embodied directly in hardware, in a software module or API executed by a processor, or combinations thereof. A software module may reside in RAM memory, flash memory, ROM memory, EPROM memory, EEPROM memory, registers, hard disk, a removable disk, a CD-ROM, or any other form of storage medium or computer program product known in the art. An exemplary storage medium or computer program product may be coupled to the processor such the processor can read information from, and write information to, the storage medium. The storage medium, computer-readable medium, or computer program product is fixed and non-transitory, and is configured to include or store code or programming instructions that, when executed by a processor or computer, effect the methods or algorithms disclosed herein.

The word "exemplary" is used herein to mean "serving as an example, instance, or illustration." Any embodiment described herein as "exemplary" is not necessarily to be construed as preferred or advantageous over other embodiments. Additionally, the previous descriptions are of some preferred examples for implementing the presently disclosed methods and apparatus, and the scope thereof should not necessarily be limited by this description. The scope of the present disclosure is defined by the following claims.

What is claimed is:

1. A method for analyzing events in a host device in a computer network system, the method comprising:
    determining at least one lookup key in a host device for an event occurring in the host device, wherein the at least one lookup key comprises one of a user ID or a session ID;
    determining whether the at least one lookup key is used in a memory to determine when at least one key-value pair exists for the event;
    appending at least one key-value pair to the event when at least one key-value pair is determined to exist for the event; and
    storing the at least one key-value pair in the memory based on the at least one lookup key including replacing existing keys found for the at least one lookup key.

2. The method of claim 1, further comprising:
    modifying the at least one lookup key to denote the at least one lookup key is a previous value when the at least one key-value pair is determined to exist for the event.

3. The method of claim 1, wherein determining the at least one lookup key further comprises deobfuscating the value of the at least one lookup key including parsing the event data, and adding the parsed event data to the event.

4. The method of claim 3, wherein parsing the event data comprises:
    searching for the presence of known malicious characters used for obfuscating data, or measuring a population standard deviation and variance and comparing the measured population standard deviation and variance with at least one predetermined threshold of change.

5. The method of claim 1, further comprising:
    determining whether the user ID or session ID is found in available keys in the memory; and
    determining whether user data for a user is stored in the memory.

6. The method of claim 5, further comprising:
    enhancing a user account of the user when the user data is determined to be stored in the memory.

7. The method of claim 6, wherein enhancing the user account includes adding enhancements including adding one or more of an account type, a domain, permissions, a list of all groups that a user is a member of, or one or more active directory attributes.

8. The method of claim 1, further comprising:
    purging the memory of at least one key-value pair when the key-value pair has a timestamp older than a predetermined time expiration value.

9. The method of claim 1, further comprising:
    determining a session ID and a process ID associated with the event; and
    linking the session ID and the process ID to create a single log output including the at least one key-value pair.

10. The method of claim 9, wherein the single log output is configured as a structured document in at least one of JSON, XML, CSV, Binary, Proprietary, UTF-8, or ASCII formats.

11. A non-transitory computer-readable medium storing computer executable code, the code when executed by a processor causes the processor to:
    determine at least one lookup key in a host device for an event occurring in the host device, wherein the at least one lookup key comprises one of a user ID or a session ID;
    determine whether the at least one lookup key is used in a memory to determine when at least one key-value pair exists for the event;
    append at least one key-value pair to the event when at least one key-value pair is determined to exist for the event; and
    store the at least one key-value pair in the memory based on the at least one lookup key including replacing existing keys found for the at least one lookup key.

12. The computer-readable medium of claim 11, wherein the code further causes the processor to:
    modify the at least one key to denote the at least one key is a previous value when the at least one key-value pair is determined to exist for the event.

13. The computer-readable medium of claim 11, wherein the code further causes the processor to determine the at least one lookup key including deobfuscating the value of the at least one lookup key including parsing the event data, and adding the parsed event data to the event.

14. The computer-readable medium of claim 13, wherein parsing the event data comprises searching for the presence of known malicious characters used for obfuscating data, or measuring a population standard deviation and variance and comparing the measured population standard deviation and variance with at least one predetermined threshold of change.

15. The computer-readable medium of claim 14, wherein the code further causes the processor to:
    determine whether the user ID or session ID is found in available keys in the memory; and
    determine whether user data for a user is stored in the memory.

16. The computer-readable medium of claim 15, wherein the code further causes the processor to:
    enhance a user account of the user when the user data is determined to be stored in the memory.

17. The computer-readable medium of claim 16, wherein enhancing the user account includes adding enhancements including adding one or more of an account type, a domain, permissions, a list of all groups that a user is a member of, or one or more active directory attributes.

18. The computer-readable medium of claim 11, wherein the code further causes the processor to:
    purge the memory of at least one key-value pair when the key-value pair has a timestamp older than a predetermined time expiration value.

19. The computer-readable medium of claim 11, wherein the code further causes the processor to:
    determine a session ID and a process ID associated with the event; and
    link session ID and process ID to create a single log output including the at least one key-value pair.

* * * * *